US011087797B2

(12) United States Patent
Abe et al.

(10) Patent No.: US 11,087,797 B2
(45) Date of Patent: Aug. 10, 2021

(54) TAPE STORAGE SYSTEM INCLUDING AT LEAST TWO TAPE STORAGE APPARATUSES FOR IMPROVED WRITING OF DATA TO BE SYNCHRONIZED

(75) Inventors: Atsushi Abe, Kanagawa-ken (JP); Takashi Katagiri, Yokohama (JP); Motoko Oe, Yokohama (JP); Setsuko Masuda, Yokohama (JP); Yutaka Oishi, Kawasaki (JP); Noriko Yamamoto, Kawasaki (JP); Katsumi Yoshimura, Fujisawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1599 days.

(21) Appl. No.: 13/376,151

(22) PCT Filed: Jun. 15, 2010

(86) PCT No.: PCT/JP2010/060111
§ 371 (c)(1),
(2), (4) Date: Dec. 2, 2011

(87) PCT Pub. No.: WO2011/001820
PCT Pub. Date: Jan. 6, 2011

(65) Prior Publication Data
US 2012/0079185 A1   Mar. 29, 2012

(30) Foreign Application Priority Data
Jun. 29, 2009   (JP) .............................. JP2009-153868

(51) Int. Cl.
*G06F 3/06* (2006.01)
*G11B 27/00* (2006.01)

(52) U.S. Cl.
CPC ............ *G11B 27/002* (2013.01); *G06F 3/065* (2013.01); *G06F 3/0614* (2013.01); *G06F 3/0686* (2013.01); *G11B 2220/90* (2013.01)

(58) Field of Classification Search
CPC .......................... G11B 27/002; G11B 2220/90
See application file for complete search history.

(56) References Cited

U.S. PATENT DOCUMENTS

| 6,856,479 | B2 | 2/2005 | Jaquette et al. |
| 6,865,043 | B2 | 3/2005 | Ataku et al. |

(Continued)

FOREIGN PATENT DOCUMENTS

| CN | 100463050 C | 2/2009 |
| JP | 2005-063444 | 3/2005 |

(Continued)

OTHER PUBLICATIONS

International Preliminary Report on Patentability from PCT application No. PCT/JP2010/060111 dated Jan. 12, 2012.

(Continued)

*Primary Examiner* — Adam M Queler
*Assistant Examiner* — Eric T Loonan
(74) *Attorney, Agent, or Firm* — Zilka-Kotab, P.C.

(57) ABSTRACT

There is provided a tape recording apparatus system capable of improving writing performance and maintaining tape recording density, for a multiple data writing request accompanied by a lot of synchronization requests from a host. The system is a tape storage system including two or more tape drives each of which has a tape mounted thereon and is provided with a buffer divided in fixed-length segments, and connected to a host that sends multiple data and a synchronization request at a predetermined timing to these tape drives. This tape recording system is provided with: a tape drive connected to the host, receiving the multiple data sent (Continued)

from the host, and, when the segment of the buffer is accumulated and filled with data, writing the accumulated data onto a tape; and another tape drive connected to the tape drive, receiving the multiple data sent from the host via the tape drive, and dumping a predetermined number of data accumulated in the segments onto a tape at a timing of receiving the synchronization request.

13 Claims, 8 Drawing Sheets

(56) References Cited

U.S. PATENT DOCUMENTS

| | | | |
|---|---|---|---|
| 7,561,372 | B2 | 7/2009 | Shiratori |
| 2003/0169527 | A1 | 9/2003 | Hanagata et al. |
| 2004/0133737 | A1* | 7/2004 | Jaquette .................... 711/111 |
| 2005/0108470 | A1* | 5/2005 | Gold et al. ................ 711/111 |
| 2007/0053091 | A1* | 3/2007 | Shiratori ...................... 360/8 |
| 2007/0079059 | A1* | 4/2007 | Itagaki et al. ............. 711/111 |
| 2008/0066192 | A1* | 3/2008 | Greco ............... G06F 21/6209 726/32 |

FOREIGN PATENT DOCUMENTS

| | | |
|---|---|---|
| JP | 2005516340 A | 6/2005 |
| JP | 2007-073108 | 3/2007 |
| JP | 2007-095231 | 4/2007 |
| WO | 9953405 A1 | 10/1999 |
| WO | 2011-001820 A1 | 1/2011 |

OTHER PUBLICATIONS

Translation of International Preliminary Report of Patentability from PCT application No. PCT/JP2010/060111 dated Feb. 23, 2012.
International Search Report from application No. PCT/JP2010/060111 dated Aug. 10, 2010.

* cited by examiner

US 11,087,797 B2

TAPE STORAGE SYSTEM INCLUDING AT LEAST TWO TAPE STORAGE APPARATUSES FOR IMPROVED WRITING OF DATA TO BE SYNCHRONIZED

RELATED APPLICATIONS

This application claims priority to PCT Patent Appl. No. PCT/JP2010/060111, filed Jun. 29, 2009, and which is herein incorporated by reference.

BACKGROUND

The present invention relates to a tape recording system including multiple tape recording apparatuses, which improves writing performance in the case of a host requiring writing of multiple data and frequently providing synchronization requests.

When a tape recording apparatus (hereinafter, a tape drive or a drive) writes data to a tape medium (hereinafter, a tape or a tape medium), the drive does not immediately write the data sent from a host. The drive once stores the data into a buffer in the drive, and starts writing after a sufficient amount of data has been accumulated.

SUMMARY

One embodiment of the present invention provides a tape storage system including two or more tape storage apparatuses each of which has a tape mounted thereon and is provided with a buffer divided in fixed-length segments, and connected to a host that sends multiple data and a synchronization request at a predetermined frequency (timing) to these tape recording apparatuses. This tape recording system is provided with: a first tape storage apparatus connected to the host, receiving the multiple data sent from the host, and, when the segment of the buffer is accumulated (prepared) and filled with data, writing the accumulated data onto a tape; and a second tape storage apparatus connected to the first tape storage apparatus, receiving the multiple data sent from the host via the first tape storage apparatus, and dumping a predetermined number of data accumulated in the segments onto a tape at a timing of receiving the synchronization request.

In one approach, this tape recording system is characterized in that: the first tape storage apparatus does not write data in the buffer until at least one segment of the buffer is completely accumulated with data, ignoring the synchronization request corresponding to the data; and when the predetermined number of data accumulated in the segments of the buffer is to be dumped onto a tape at the timing of the synchronization request, the second tape storage apparatus pads an area of the segments which is unfilled with the data because the segments are not completely accumulated with the data, to write out all the data of the segments.

In another approach, this tape recording system is characterized in that: a tape on which writing has been performed by the first tape storage apparatus is treated as an regular writing tape to which data accumulated in the segments of the buffer are written as data sets; and on a tape on which writing has been performed by the second tape storage apparatus, data accumulated in the segments are written as data sets, and the interval between the data sets on the tape reflects the time interval of the synchronization request.

In yet another approach, this tape recording system is characterized in that: the second tape storage apparatus is able to continuously and overwritably use a tape area for the second tape storage apparatus in which data already written in a tape for the first tape storage apparatus is stored.

In still another approach, this system is characterized in that: if a data writing error occurs in the first tape storage apparatus, and the data has already been written in the second tape storage apparatus, the data writing error is not reported to the host.

In a further approach, this system is characterized in that: if a data writing error occurs in the second tape storage apparatus, and the data has already been written in the first tape storage apparatus, the data writing error is not reported to the host.

In an additional approach, this system is characterized in that: if a data writing error occurs in the second tape storage apparatus, the error data is written again into an unused tape area which includes a tape storage area for the second tape storage apparatus that stores data already written in the first tape storage apparatus.

In some approaches, this system is characterized in that: if a data writing error occurs in the first tape storage apparatus, the data is written from a BF tape of the second tape storage apparatus to restore data at an error position of the tape for the first tape storage apparatus via inter-drive communication connection.

In more approaches, this system is characterized in that: the host and the directly connected drive communicate with each other via Fibre Channel or SCSI, and communication between the drives is via Ethernet (R).

Furthermore, another embodiment of the present invention provides a tape storage system including two or more tape storage apparatuses each of which has a tape mounted thereon and is provided with a buffer divided in fixed-length segments, and connected to a host that sends multiple data and a synchronization request at a predetermined frequency (timing) to the tape recording apparatuses. This tape recording system is provided with: a first tape storage apparatus connected to the host, receiving the multiple data sent from the host, and dumping a predetermined number of data accumulated in the segments onto a tape at a timing of receiving the synchronization request; and a second tape storage apparatus connected to the first tape storage apparatus, receiving the multiple data sent from the host via the first tape storage apparatus, and, when the segment is accumulated (prepared) and filled with the data, writing the accumulated data onto a tape.

Regarding the tape recording systems which are configured as described above and which include at least two or more tape drives, there is obtained an advantageous effect of, for data writing from a host accompanied by frequent synchronization requests, improving writing performance and maintaining tape recording density.

DETAILED DESCRIPTION

A description will be made below on some typical embodiments (hereinafter referred to as "embodiments") of a tape storage system of the present invention. These embodiments are only examples and do not limit the tape storage system of the present invention.

Figure 1:
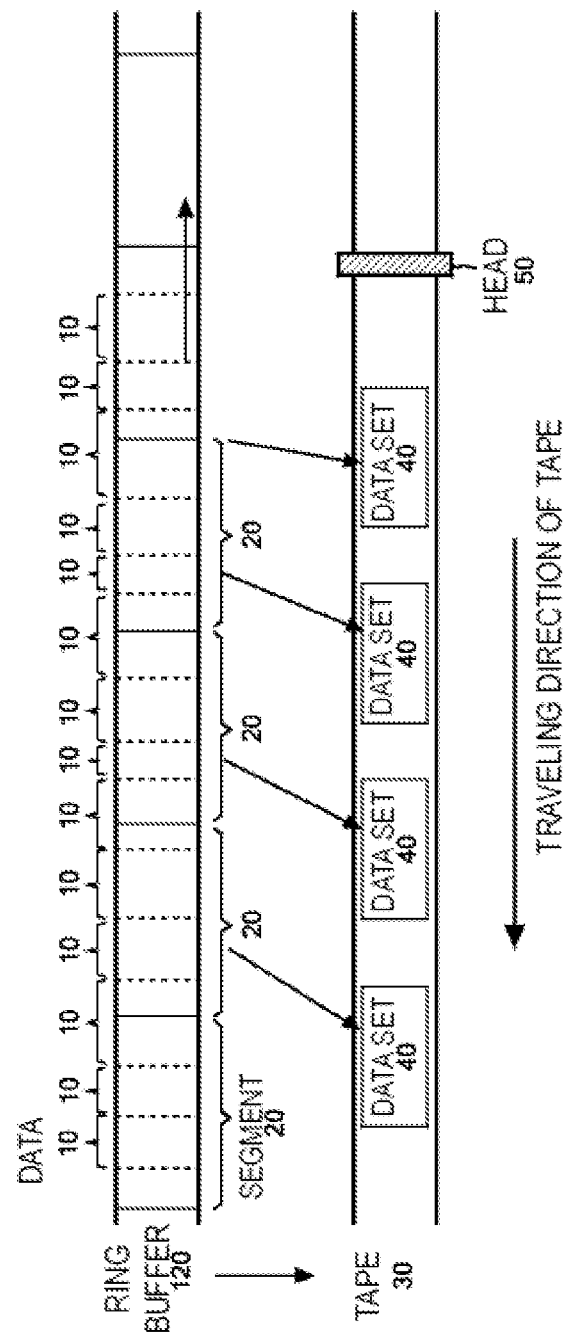
FIG. 1 shows correspondence between a buffer and written data (data sets) on a tape.

FIG. 1 shows correspondence between a buffer and written data (data sets) on a tape. A buffer 120 is in the form of a ring divided in fixed-length segments 20. Multiple variable-length data 10 sent from a host are sequentially accumulated in a segment 20. When the segment 20 is completely filled with data, a head 50 writes the contents onto a tape 30 as a data set 40.

When all the data has been written onto the tape, and the segments of the buffer 120 become empty, the writing ends. When the writing is complete, the drive rewinds the tape in preparation for the next writing process. The position of the writing magnetic head of the drive is aligned with the position of the data end on the tape. This operation is called backhitch.

It takes about five seconds for one backhitch. It is desirable that the drive continues writing without backhitch as far as possible, from the viewpoint of writing performance. In regular writing, the writing is performed while data is accumulated in the segments of the buffer in the drive. The data 10 are sequentially stored into the buffer from the host over time, and sequentially written onto the tape as a data set when a segment is filled with the data. In regular writing from the host, since data is continuously sent, it is less likely that the buffer is completely emptied during the writing, and backhitch seldom occurs.

The host sometimes dumps all the data in the buffer onto the tape; that is, the host provides a synchronization request (Flush). The synchronization request is issued to confirm that the data temporarily stored in the buffer 120 has been written onto the tape. When the drive performs writing by flush, the buffer becomes empty of data, and therefore, backhitch occurs. When the synchronization request is issued frequently, the number of backhitches increases, and the writing performance is deteriorated.

In order to prevent the performance deterioration, the drive can perform writing without backhitch in response to a synchronization request for data stored in the buffer. This writing method is referred to as backhitchless flush. In this writing method, since data is written onto a tape with data sets largely spaced apart from each other, the recording density of the tape is decreased.

In order to avoid such backhitch between synchronization requests, tape drives may implement a function called Recursive Accumulating Backhitchless Flush (RABF), as described in U.S. Pat. Nos. 6,856,479 and 6,865,043. BF (Backhitchless Flush) literally means writing which does not cause a backhitch operation. In writing with the RABF system, a tape drive can avoid time loss for backhitch and decrease in recording density for each synchronization request. This RABF function is described in detail below with reference to FIG. 3.

With this function, if a host frequently requests synchronization (Flush), data can be written into a track area (an ABF area: Accumulate Backhitchless Flush region) different from a regular track area usually used for writing arbitrary variable-length data, without backhitch. Hereinafter, this writing function will be called BFWrite (Backhitchless Flush Write).

After a certain amount of data is written, the data is rewritten into the regular area where the data should be written. This writing is called ReWrite (Recursive Write).

In this RABF operation, it is not necessary to wait for a succeeding series of data to come from the host, backhitch does not intervene, and deterioration of writing performance is reduced.

Furthermore, since a succeeding data set can be written immediately after a data set recorded on a tape, decrease in recording density can be avoided.

The RABF function has the following problem. BFWrite and ReWrite are alternately performed by one drive. Therefore, the regular track area and the ABF area are revisited frequently, and much time is required for the movement. Furthermore, since the same data is written twice both into the regular track area and the ABF area, extra time is required.

It is desired to guarantee the characteristic advantage of the RABF technique of providing a writing method which prevents backhitch from occurring when a synchronization request frequently occurs for each data. At the same time, it is desired to realize further improvement of writing performance.

Therefore, in order to solve the above problem, one embodiment of the present invention provides a tape recording apparatus system which includes multiple tape storage apparatuses in one embodiment.

Furthermore, another embodiment of the present invention provides a tape recording system which, if a data writing error occurs in one tape drive, restores the data error.

In preferred embodiments of the present invention, two tape drives are used for the RABF function performed by one tape drive to omit writing by movement of a head accompanying the ReWrite operation. In one particular approach of the present invention, a tape storage system includes at least two tape drives, and this tape recording system is connected to a host. One drive performs ReWrite writing of the RABF function. This one drive is called an "R drive". The other drive performs BF writing in response to a synchronization request from the host. This one drive is called a "BF drive". In the tape storage system of the present invention, since these two function operations are performed by the two drives at the same time, writing performance is improved more than the RABF function.

Figure 2:
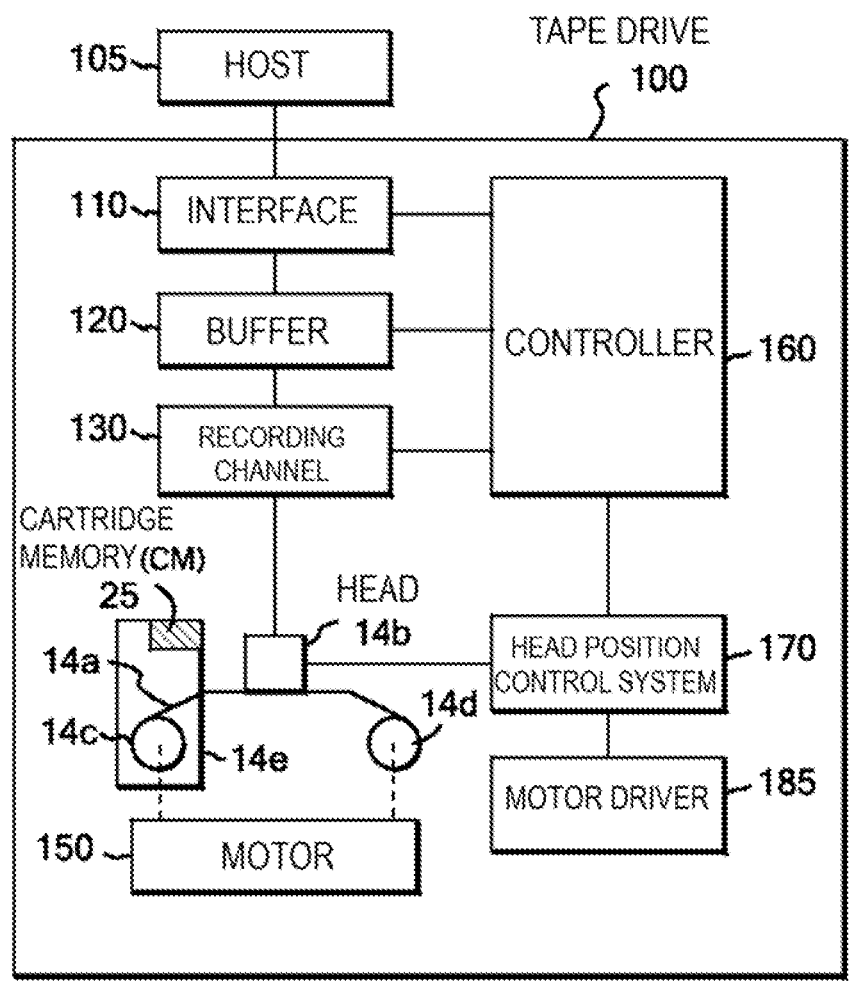
[FIG. 2 shows a configuration diagram of a tape drive 100.

First, a description will be made regarding the driving of a tape recording apparatus (tape drive) which is a component of the present invention. FIG. 2 shows a configuration diagram of a tape drive 100. The tape drive 100 includes an interface 110, a buffer 120, a recording channel 130, a tape 14a, a head 14b, reels 14c and 14d, a cartridge 14e having a cartridge memory (CM) 25, a motor 150, a controller 160, a head position control system 170 and a motor driver 185.

The interface 110 communicates with a host 105. The interface 110 receives a command instructing writing of data transferred to the buffer 120 and a command instructing writing of data in the buffer 120 to the tape 14a, from the host 105. For example, the communication standard of the interface 110 is SCSI or Fibre Channel. In the case of Fibre Channel, a request (command) to write to the buffer corresponds to Write. A synchronization request (command) to write out data existing in the buffer corresponds to WriteFM0.

The buffer 120 is a memory for accumulating variable-length data (see e.g., #10 of FIG. 1) to be written onto the tape 14a and is configured by a DRAM (Dynamic Random Access Memory). The buffer 120 is separated in fixed-length segments (see e.g., #20 of FIG. 1). The data (see e.g., #10 of FIG. 1) with an arbitrary length is transferred from the host 105 to the drive, as shown in FIG. 2. The buffer 120 is called a ring buffer in the sense that it receives data up to the last segment and then starts to receive data from the first segment again. One segment (see e.g., #20 of FIG. 1) corresponds to one data set (see e.g., #40 of FIG. 1) on the tape 14a of FIG. 2 (or the tape 30 of FIG. 1). One data set is constituted by a part of one data or multiple data sent from the host 105.

The writing timing is when a segment is completely filled with data and when an area unfilled with data in a segment is filled by data padding in response to a synchronization request from the host. In this specification, these two cases in which a segment is filled with data may be expressed as a segment having been "prepared".

The tape 14a is a tape medium as data recording means. Data handed over via the recording channel 130 is written onto the tape 14a by the head 14b as a data set. The tape 14a is wound around the reels 14c and 14d, and laterally moves from the reel 14c toward the reel 14d, or vice versa accompanying their rotation. The cartridge 14e is a container for containing the reel 14c around which the tape 14a is wound. The same cartridge as the cartridge 14e may be provided to contain the reel 14d. The motor 150 rotates the reels 14c and 14d.

The tape cartridge 14e is provided with a contactless non-volatile memory called a cartridge memory (CM) 25 therein. The tape drive 100 contactlessly reads from and writes to the CM 25. The tape drive updates tape directory information (attribute information about written data) in the CM. When reading data, the tape drive refers to the information included in the CM and moves the tape to a destination position at a high speed to enable alignment.

The controller 160 controls the whole tape drive 100. The controller 160 controls writing/reading of data to/from the tape 14a in accordance with a command received by the interface 110 from the host 105. The controller also controls the head position control system 170 and the motor driver 185. The head position control system 170 traces a desired one or multiple WRAPs (sets of multiple tracks). When it becomes necessary for the head 14b to switch the track, the head position control system 170 performs control to electrically switch the head 14b. The motor driver 185 may be directly connected to the controller 160.

If the next synchronization request is made without stopping the tape 14a, there exists a wasteful long recording area between data written in response to the preceding synchronization request and data written in response to the next synchronization request. In order to reduce wasteful use of the recording capacity in a tape drive operation, it is necessary to minimize the interval between data sets written in the longitudinal direction of a tape medium.

By a backhitch operation, the tape medium 14a is aligned with the head 14b so that the next data is written immediately after a data set written in the tape medium. Relative to the head 14b, the tape 14a reduces the traveling speed and once stops. After that, the tape medium is rewound to a position where writing is to be performed, and the writing motor 150 for aligning the head with a tape position where the next data is to be written is driven. About three to five second extra time is spent for this operation. If a synchronization request is issued from the host for each of writing of multiple data, the backhitch operation occurs frequently, and the performance of writing data transferred from the host is deteriorated. Therefore, large-size tape drives adopt a writing system called RABF, as described in previously cited U.S. Pat. Nos. 6,856,479 and 6,865,043, in order to avoid such backhitch caused at the time of performing writing accompanied by a lot of synchronization requests.

Figure 3:
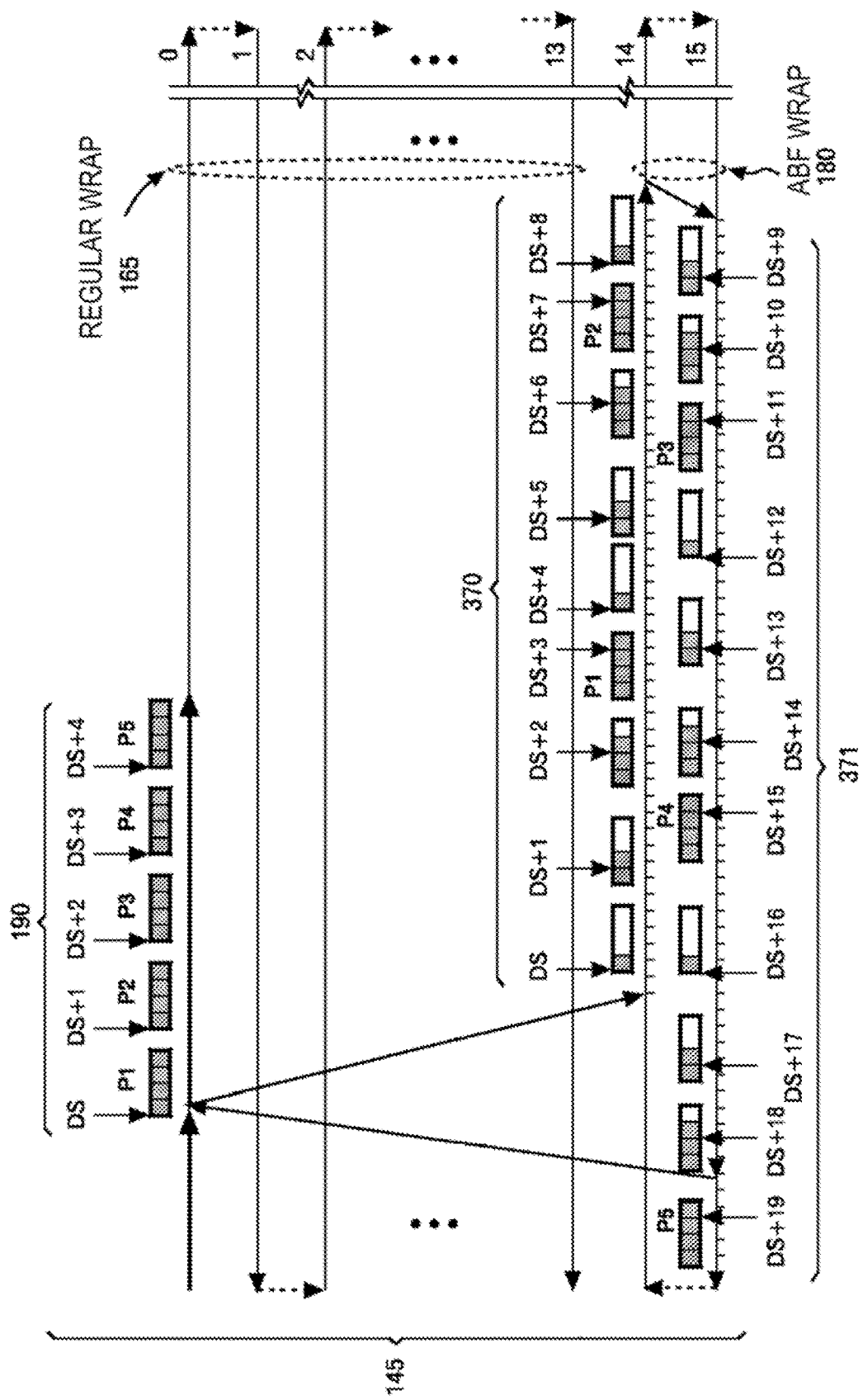
[FIG. 3 shows a conceptual diagram of an RABF writing system.

FIG. 3 shows a conceptual diagram of the RABF writing system. This is a method in which one tape drive performs writing by using a band of multiple tracks 145 as a temporary storage WRAP 180 (ABF WRAP) and a regular WRAP 165 separately. One head (such as the exemplary tape head 14b of FIG. 2) has, for example, eight or sixteen writing/reading channels. A WRAP is a collection of multiple (for example, eight or sixteen) tracks, and it is a unit of tracks which one head (see e.g., the tape head 14b of FIG. 2) reads or writes at the same time. Data transferred from the host is written to the ABF WRAP 180 (tracks 14 and 15) first without backhitch. Since the ABF WRAP is an extended buffer for temporarily storing data at the time of writing the data to a tape, and the data is temporarily stored in the tape, it is possible to prevent disappearance of the data in the case of interruption of power supply and the like. The regular WRAP 165 is constituted by tracks 1 to 13 to which data sets are written without wastefully using the recording capacity. When receiving a synchronization request, the tape drive writes data in the buffer into the ABF WRAP 180 without backhitch, while causing the tape medium to continue traveling. The data sets written in the ABF WRAP are written back to the regular WRAP 165, that is, ReWrite is performed, via a buffer (see e.g., the buffer 120 shown in FIG. 1). The data sets (DS, DS+1, DS+2, . . . ) are written at synchronization request intervals in a manner that data indicated by being shaded is newly and successively added to preceding data indicated by being shaded. The writing of these data sets is buffer flash which is not accompanied by backhitch (Backhitchless Flush). This writing is called BFWrite (BF is an abbreviation of backhitchless flush). An arrow for each data set indicates a pointer for the buffer being accessed by writing/reading control. The data sets DS+3, DS+7, DS+11, DS+15 and DS+19 are data sets P1, P2, P3, P4 and P5 filled (prepared) with data. The operation of writing these prepared data sets P1, P2, P3, P4 and P5 to the regular WRAP 165 (tracks 1, 2, 3, . . . , and 13) at a constant timing is recursively performed. This writing operation is called ReWrite (Recursive Write). By the ReWrite operation, the data sets P1 to P5 completely filled (prepared) with data are written to the regular WRAP 165 without wastefully using the storage capacity. Since the tape drive adopting this RABF system does not have to perform backhitch in response to synchronization requests issued continuously, improvement of the writing performance can be realized. One tape drive which has received writing of multiple data and a synchronization request performs the RABF function as the separate BFWrite and ReWrite functions.

Contribution to the whole writing performance, in the case where it is assumed that the ReWrite writing operation is omitted between the two operations, is examined. RABF writing is performed by the current tape drive, and processing time is measured. In the experiment, a process of making a synchronization request each time 1 MB of the amount of data of 680 MB was repeated, as an example of such a way of writing that RABF is effective. As a temporary storage areas (ABF WRAPs), adjoining two WRAPs ABF1 and ABF2 are given. Writing/reading is performed for these two WRAPs in opposite directions. BFWrite was performed for these ABF areas. Next, ReWrite is performed for the regular WRAP.

Figure 4:
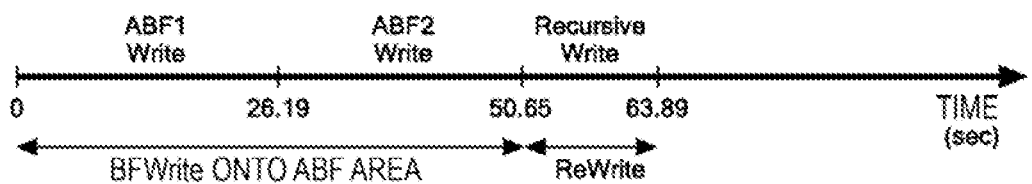
FIG. 4 shows a typical time chart of BFWrite and ReWrite at the time of performing RABF writing.

FIG. 4 shows a typical time chart of BFWrite and ReWrite at the time of performing RABF writing. Each event and WRAP time thereof are shown below. The host makes a synchronization request each time 1-MB data is transferred to a drive. Data (1 MB) sequentially sent are written to the WRAPs ABF1 and ABF2 by BFWrite without backhitch. In the experiment, when data corresponding to a data set is prepared, ReWrite of the data set to the regular WRAP occurs frequently. Referring to FIG. 4 and the event time shown below, it is seen that ReWrite occupies more than 20 percent of the whole writing period.

| Event | Wrap time |
| --- | --- |
| ABF1 BFWrite start | 0 |
| ABF2 BFWrite start | 26.19 sec |
| ReWrite start | 50.65 sec |
| ReWrite end | 63.89 sec |

About 63.89 seconds were required to write 680 MB using the RABF function in one tape drive. In the writing method using two tape drives in the present invention, only 50.65 seconds are required to write the same amount because time for ReWrite can be reduced. From (50.65/63.89)×100=79.27%, it is known that the processing time can be reduced by more than 20 percent. This is an example of a typical case, and the processing time may be reduced more depending on the sequence. If this ReWrite operation can be ignored by using two tape drives, the writing performance is improved more in comparison with the RABF function performed with one drive.

One drive performs transmission/reception of data between the host and the drive. At the same time, two drives can perform transmission/reception of data between the drives by a communication function, for example, by Ethernet.

A BF drive reports completion of writing to the host. At the same time, it transmits data to the other R drive using inter-drive communication. The other R drive performs writing when sufficient data has been accumulated in a buffer (see e.g., the buffer 120 shown in FIG. 1) without depending on a synchronization request from the host.

In the case of a tape to which writing is performed by BFWrite without backhitch, writing is performed with a low recording density, and therefore, the tape consumption speed is high in comparison with a tape to which writing is performed with ReWrite. However, the ABF area of the tape to which BFWrite has been performed plays a role of a temporary cache until ReWrite is completed. Data in the ABF area for which ReWrite has been completed successfully may be overwritten. By using a tape used for the BF drive as an endless tape while overwriting data for which ReWrite writing has been completed, the tape used for the BF drive is never finished up.

Even if an error occurs at the time of writing data for which completion of writing has been reported, to one R drive, the data can be read out from the tape for which writing was performed by the BF drive. Because data for which writing has been completed by the BF drive can be restored by the tape in the other R drive, a situation that the data cannot be read out does not occur. Usually, a tape for which ReWrite has been performed is used at the time of reading out. Because the tape for ReWrite is a tape on which writing has been performed with a high density, the reading performance is also good.

As for the positional relation between the host, and the BF and R drives, two kinds of methods are conceivable: a method in which the R drive is connected to the host and a method in which the BF drive is connected to the host. A processing procedure in each of the configurations is shown below. No matter which configuration writing is performed in, the same procedure for a reading process and procedure for a process performed at the time of occurrence of an error are used.

A first embodiment is the method in which the R drive is directly connected to the host.

For a tape mounting process in accordance with the first embodiment, the host makes a request to mount a tape on which writing is to be performed, to the R drive. The R drive mounts an R tape and reports completion thereof to the host. On the other hand, the BF drives mounts a BF tape.

Figure 5:
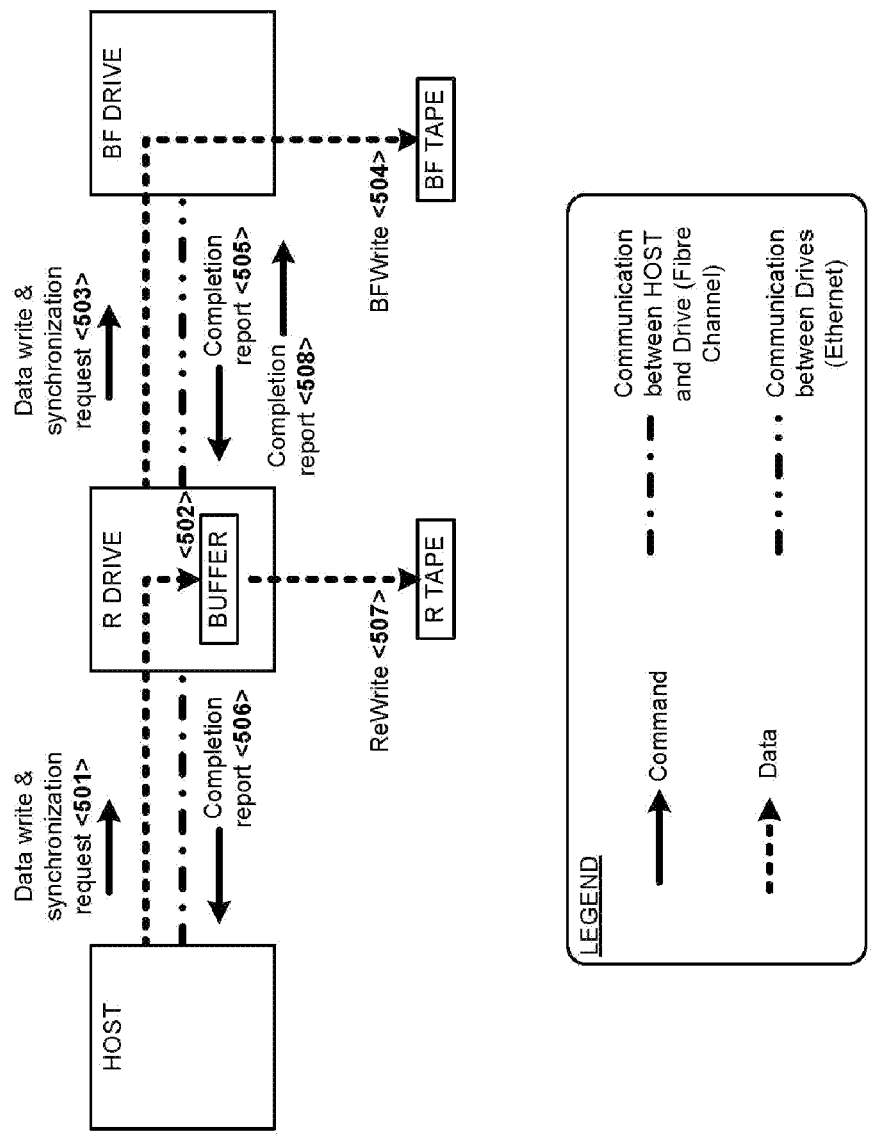
FIG. 5 shows a writing process of a first embodiment.

FIG. 5 shows a writing process of the first embodiment. The host sends multiple variable-length data to the tape recording system. The host sends a synchronization request to the data recording system immediately after particular data. By this synchronization request, the host can certainly record multiple data before the particular data, onto the tape. A tape for the R drive is called an "R tape". A tape for the BF drive is called a "BF tape".

<501> The host repeats writing (Write) of data to the R drive and a request of synchronization (Flush) thereof <502> The R drive sequentially accumulates the data into the buffer in the drive.

<503> For each data, the R drive transmits the data to the BF drive using inter-drive communication and makes a synchronization request simultaneously with the process of the step <502>.

<504> The BF drive immediately writes the data transmitted from the R drive to a BF tape even if one segment of the buffer is not completely filled with data. The image of each data written in tracks of the BF tape may be the same as the data sets (DS, DS+1, DS+2, . . . ) sequentially written in the ABF WRAPs of the RABF technique shown in FIG. 3. Each data set is written into a track of the BF tape in a backhitchless manner.

<505> The BF drive makes a writing completion report to the R drive using inter-drive communication.

<506> The R drive sends the writing completion report received from the BF drive, to the host.

<507> When one segment of the buffer is completely filled with multiple data, the R drive writes the multiple data of the segment to an R tape.

<508> The R drive makes a writing completion report to the BF drive.

In the continuous writing process described above, the BF drive treats a recording position on the BF tape where data which has already been written (recorded) on the R tape of the R drive is recorded, as overwritable free space.

A second embodiment is the method in which the BF drive is directly connected to the host.

For a tape mounting process in accordance with the first embodiment, the host makes a request to mount a tape on which writing is to be performed, to the BF drive. The BF drive requests the R drive to mount an R tape using inter-drive communication. The BF drives itself mounts a BF tape. The R drive mounts the requested R tape and makes a completion report to the BF drive through inter-drive communication. The BF drive sends the mounting completion report from the R drive, to the host. Thereby, it appears to the host that the BF drive mounts the R tape, and the host recognizes that it is performing writing to the R tape.

Figure 6:
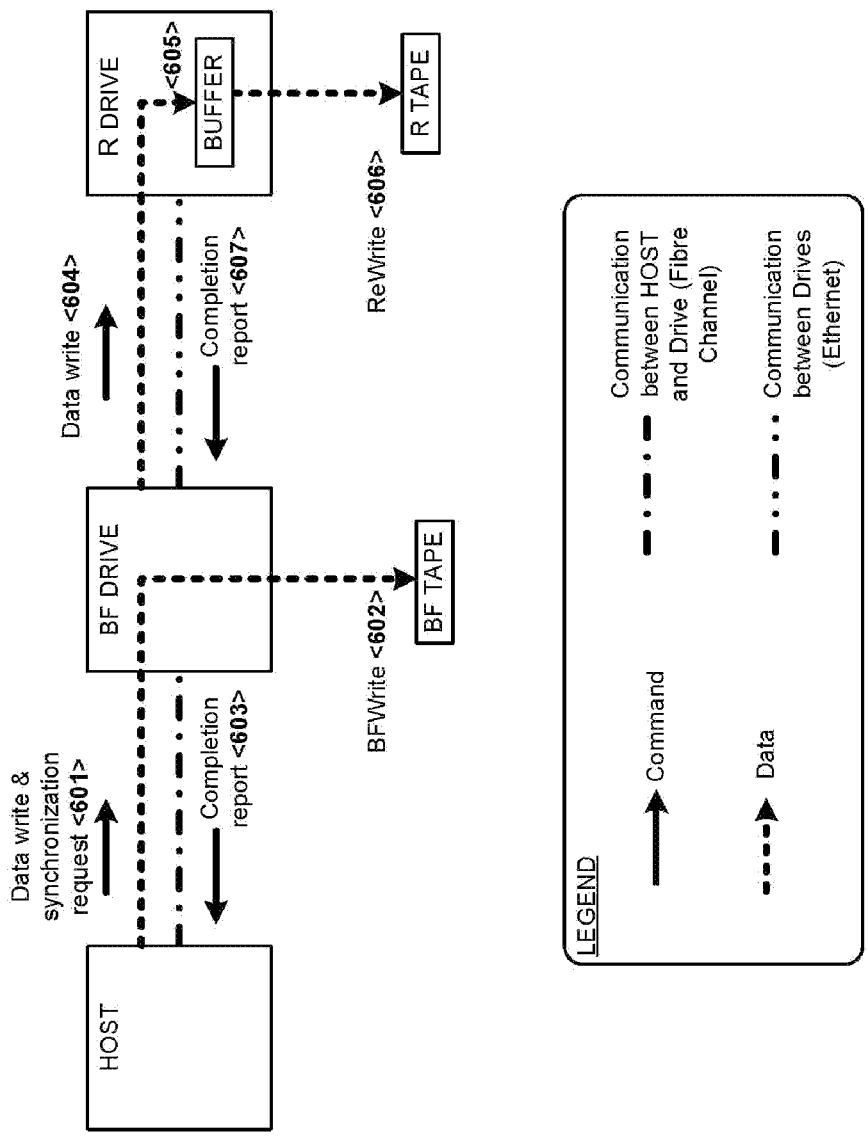
FIG. 6 shows a writing process of a second embodiment.

FIG. 6 shows a writing process of the second embodiment. The host sends multiple variable-length data to the tape recording system. The host sends a synchronization request to the data recording system immediately after particular data. By this synchronization request, the host can certainly record multiple data before the particular data, onto the tape.

<601> The host repeats data writing (Write) to the BF drive and request of synchronization (Flush) thereof <602> The BF drive immediately writes the data to a mounted BF tape even if a segment of the buffer is not filled. The image of each data written in tracks of the BF tape may be the same as the data sets (DS, DS+1, DS+2, . . . ) sequentially written in the ABF WRAPS of the RABF technique shown in FIG. 3. Each data set is written into a track of the BF tape backhitchlessly.

<603> The BF drive makes a writing completion report to the host.

<604> Simultaneously with the process of the step <603>, the BF drive transmits each data to the R drive using inter-drive communication and requests writing.

<605> The R drive sequentially accumulates each data transmitted from the BF drive into the buffer.

<606> When one segment of the buffer is filled with data and a data set is prepared, the R drive writes the data to an R tape.

<607> The R drive makes a writing completion report to the BF drive.

In the continuous writing process described above, the BF drive treats a recording position on the BF tape where data which has already been written (recorded) on the R tape of the R drive is recorded, as overwritable free space.

A reading method is common to the first and second embodiments. No matter which configuration writing is performed in, the host recognizes that it has written data onto an R tape. Therefore, at the time of performing reading, reading from the R tape is requested.

A process performed at the time of a writing error is common to the first and second embodiments. There may be a case where an error occurs in either of the BF drive or the R drive at the time of writing. In the tape storage system of the first and second embodiments, it is not necessary to report the error to the host if writing of the relevant data has been successful in the other drive.

Processing of a writing error in the BF drive will next be described.

The BF drive rewrites the data in which an error has occurred, to another place of the tape. There is a high possibility that a writing error can be avoided by changing the writing position on a tape. As the position to start the rewriting, the top of the tape is conceivable. However, in the case of the BF drive, it is necessary to avoid overwriting onto an area of data the writing of which by the R drive has not been completed, on a BF tape. This is because, if writing of data by the R drive fails, the data cannot be restored on a BF tape. It is necessary to pay attention to disappearance of data at the R drive when performing error processing at the time of writing onto a BF tape. The period during which data may disappear corresponds to a period during which, though data exists in the buffer of the R drive, writing of the data to a tape has not been completed.

Even during movement to a rewriting position is performed in the BF drive, the R drive can continue writing. Even when rewriting is performed in the BF drive, and the writing is not successful, it is not necessary to make an error report if the relevant data can be written by the R drive.

Since an R tape is used at the time of reading, it is not necessary to be conscious of an error on a BF tape.

Processing of a writing error in the R drive will next be described.

If a writing error occurs in the R drive, the R drive records the position where the error has occurred, onto the non-volatile memory (CM) 25 mounted on the cartridge. In order to prevent overwriting of the data, the BF drive stores the range of the data which could not be written by the R drive, in the CM as a non-overwritable tape storage area.

Even if the host requests writing after occurrence of an error, it is not possible to add data to an R tape on which the error has occurred. Therefore, the R drive requests the host to exchange the R tape, and the succeeding writing is performed with the use of another tape. The BF drive performs writing onto a storage area other than the tape recording area prohibited to be overwritten, which has been stored in the CM.

A process performed at the time of a reading error is common to the first and second embodiments. If an error occurs at the time of reading of an R tape, a method similar to the case of reading with the current RABF function is applicable. In the method, since the position of data on a BF tape can be known from information about a data set (DSIT: Data Set Information Table) which could be read last on an R tape and information in the CM, the data is read from the BF tape.

In the description of the first and second embodiments, the configuration with one host and two drives has been described for simplification. However, the number of hosts and the number of drives are not limited thereto. Multiple hosts and multiple drives may be given as shown below.

Figure 7:
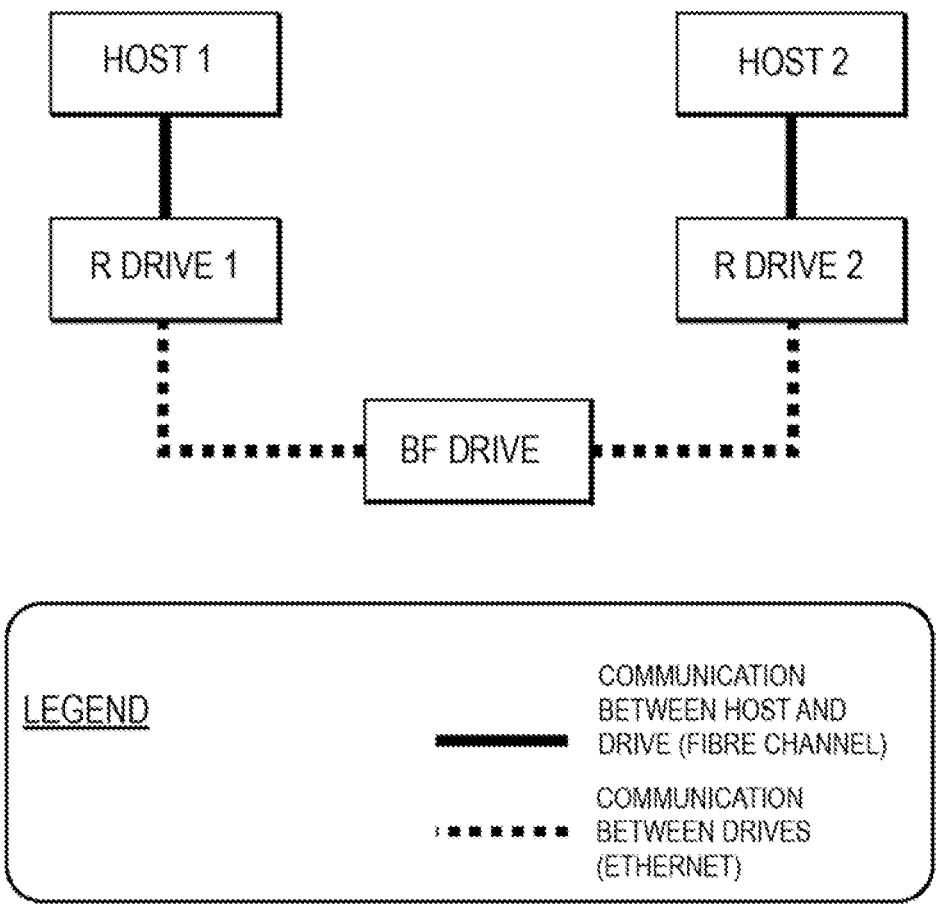
FIG. 7 shows a third embodiment in which two hosts and three drives exist.

A third embodiment shows a configuration in which one R drive corresponds to each of two hosts, and one BF drive is shared. FIG. 7 shows the third embodiment in which two hosts (HOST 1, HOST 2) and three drives (R DRIVES 1 and 2, BF DRIE) exist. In this case, the one BF drive plays a role of a cache for the two R drives. The writing process flow, the reading method and the process performed at the time of a writing error are the same as those of the first embodiment. However, one BF drive is shared by two R drives. The BF drive is required to distinguish data to be recorded onto a BF tape, either for the R drives 1 or 2, before executing BFWrite.

For example, it can be identified as described below which of the R drives 1 or 2, data temporarily recorded on a BF tape is for. It is distinguished which of the R drives the last data, among multiple data included in a data set recorded on a BF tape, is for. Therefore, any of the R drives 1 and 2 that the last data corresponds to is stored in the DSIT. More specifically, for the last data included in each of the data sets (DS, DS+1, DS+2, . . . ) on the tracks of a BF tape based on the RABF technique (FIG. 3) in the writing process of the first embodiment, it is distinguished whether the data is for the R drive 1 or 2 by the DSIT of each data set.

A fourth embodiment is a tape recording system capable of switching multiple tape drives among the works of a BF drive, an R drive and an regular drive according to situations. For example, in a tape recording library constituted by multiple drives, other drives which are not used can be effectively utilized as BF drives.

In the tape library (library, tape storage system) including the multiple tape drives, there is no difference among the BF drive, the R drive and the regular drive, from the viewpoint of hardware. If the works of the multiple various kinds of tape drives included in the tape recording system can be changed according to situations, the system operability of the tape library is improved.

Figure 8:
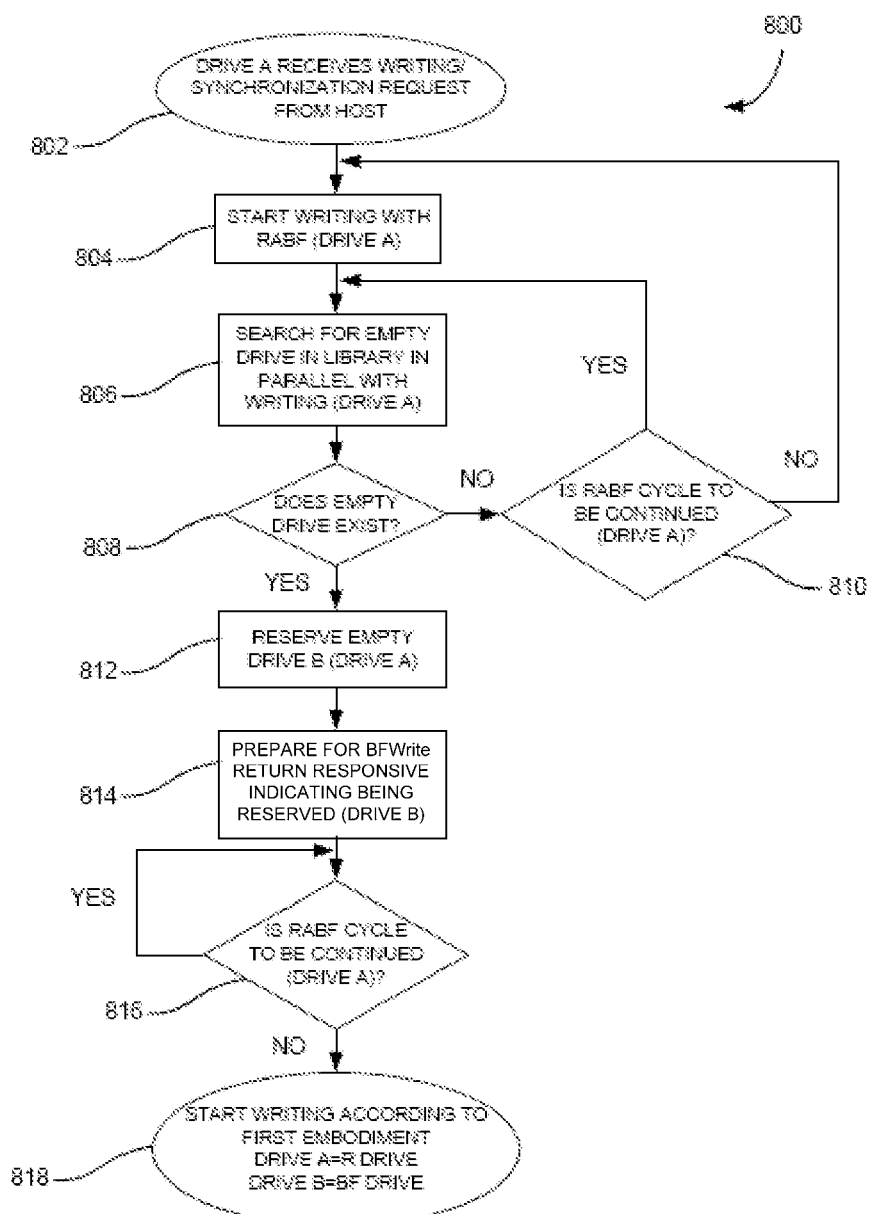
FIG. 8 shows an example of a procedure for a tape drive to switch among the works of a BF drive, an R drive and an regular drive functioning alone according to situations, as a fourth embodiment.

FIG. 8 shows an example of a procedure 800 for a tape drive to switch among the works of a BF drive, an R drive and an regular drive functioning alone according to situations.

<802> A certain tape drive (drive A) in a library receives writing (Write) and synchronization (Flush) requests from the host.

<804> The drive A operates as an regular drive and writes data to a tape by the RABF function.

<806> In parallel to the step <804>, the drive A searches for a tape drive which is not used by the host (an empty drive) from drives in the library.

<808> A determination is made if an empty drive exists.

<810> If an empty drive is not found, the writing cycle by the RABF function is continued.

<812> If an empty drive (drive B) is found, the drive A causes the drive B to be in a reserved state.

<814> The drive B prepares for BFWrite. A BF tape cartridge is mounted. When receiving a use request, the drive B returns a response to the effect that it is reserved (Reservation Conflict).

<816> When the writing by the RABF function started at <804> is paused, the drive A ends continuation of the RABF cycle.

<816> The writing process according to the embodiments described above (for example, the first embodiment) is started. The drive A functions as an R drive and uses the drive B as a BF drive. After that, this tape library executes a writing process similar to the first embodiment (the method in which an R drives is directly connected to a host). By using the above procedure, it is possible to apply the writing method of the present invention in an existing tape library without newly adding a drive.

The embodiments have been described with regard to a tape drive. However, the contents of the presents invention are not limited thereto. The host (upper apparatus) is not limited to a host computer such as a server, and an embodiment is also included in the present invention in which a data recording apparatus is an upper apparatus, and the tape recording system of the present invention is a lower apparatus. According to the tape recording system shown above which includes at least two or more tape drives, there is obtained an advantage that, irrespective of frequent synchronization requests, it is possible to maintain tape recording density without deteriorating data writing performance.

The invention claimed is:

1. A tape storage system, comprising:
a first tape storage apparatus having a first buffer divided into fixed-length segments, the first tape storage apparatus configured to:
receive at the first tape storage apparatus a first data cluster from a host operatively coupled thereto;
receive at the first tape storage apparatus a synchronization request from the host, where the synchronization request is received after the first data cluster;
in response to receiving the first data cluster and the synchronization request from the host:
add the first data cluster to one of the fixed-length segments of the first buffer of the first tape storage apparatus, where the first buffer is separate from a first tape;
transmit the first data cluster and the synchronization request from the first tape storage apparatus to a second tape storage apparatus operatively coupled to the first tape storage apparatus;
receive, at the first tape storage apparatus, a writing completion report from the second tape storage apparatus indicating that the first data cluster is written onto a second tape in the second tape storage apparatus; and
send the writing completion report received from the second tape storage apparatus from the first tape storage apparatus to the host;
receive at the first tape storage apparatus a second data cluster from the host;
in response to receiving the second data cluster from the host:
add the second data cluster to the one of the fixed-length segments of the first buffer of the first tape storage apparatus; and
transmit the second data cluster from the first tape storage apparatus to the second tape storage apparatus;
determine that the one of the fixed-length segments of the first buffer of the first tape storage apparatus is completely filled; and
write the first data cluster and the second data cluster from the one of the fixed-length segments of the first buffer of the first tape storage apparatus onto the first tape, in response to determining that the one of the fixed-length segments of the first buffer of the first tape storage apparatus is completely filled.

2. The tape storage system according to claim 1, wherein the first tape storage apparatus is further configured to:
identify an error occurring when writing the first data cluster and the second data cluster onto the first tape;
record, onto non-volatile cartridge memory of the first tape storage apparatus, an error position where the error occurred;
receive, from the second tape storage apparatus at the first tape storage apparatus via an inter-drive communication connection between the first tape storage apparatus and the second tape storage apparatus, data corresponding to the error; and
write the data corresponding to the error at the error position within the first tape, without reporting a data writing error to the host.

3. The tape storage system according to claim 1, wherein the first tape storage apparatus is further configured to send a writing completion report from the first tape storage apparatus to the second tape storage apparatus after writing the first data cluster and the second data cluster from the one of the fixed-length segments of the first buffer of the first tape storage apparatus onto the first tape.

4. The tape storage system of claim 1, wherein the first tape storage apparatus is further configured to:
identify an error occurring when reading predetermined data from the first tape;
identify a position of the predetermined data within the second tape in the second tape storage apparatus, utilizing a data set information table (DSIT) stored on the first tape; and
read the predetermined data from the second tape in the second tape storage apparatus, utilizing the position of the predetermined data within the second tape in the second tape storage apparatus.

5. The tape storage system of claim 1, wherein the first data cluster and the second data cluster are written onto the first tape by the first tape storage apparatus at a constant timing, without performing a backhitch.

6. The tape storage system of claim 1, wherein the first tape storage apparatus is further configured to:
  receive, from the host at the first tape storage apparatus, a request to read the first data cluster; and
  reading, by the first tape storage apparatus, the first data cluster out to the host.

7. The tape storage system of claim 1, wherein the first tape storage apparatus that receives the synchronization request from the host is configured to write accumulated data onto the first tape in response to determining that one of the fixed-length segments is filled with data without depending on the synchronization request from the host, and the second tape storage apparatus that receives the synchronization request from the first tape storage apparatus is configured to write accumulated data onto the second tape at a timing corresponding to the synchronization request.

8. The tape storage system of claim 1, wherein the first tape storage apparatus that receives the synchronization request from the host does not write data in the first buffer of the first tape storage apparatus to the first tape until at least one of the fixed-length segments of the first buffer of the first tape storage apparatus is completely filled.

9. The tape storage system of claim 1, wherein once the first data cluster and the second data cluster are written from the one of the fixed-length segments of the first buffer of the first tape storage apparatus onto the first tape, corresponding data on the second tape is overwritten by the second tape storage apparatus.

10. The tape storage system of claim 1, wherein the second tape storage apparatus fills an unfilled area of a fixed-length segment of a second buffer of the second tape storage apparatus using data padding in response to the synchronization request.

11. The tape storage system of claim 1, wherein the first buffer of the first tape storage apparatus includes dynamic random-access memory (DRAM).

12. A computer program product, comprising a non-transitory computer readable storage medium having computer readable program code embodied therewith, the computer readable program code comprising computer readable program code configured to cause a first tape storage apparatus having a first buffer divided into fixed-length segments to:
  receive at the first tape storage apparatus a first data cluster from a host operatively coupled thereto;
  receive at the first tape storage apparatus a synchronization request from the host, where the synchronization request is received after the first data cluster;
  in response to receiving the first data cluster and the synchronization request from the host:
    add the first data cluster to one of the fixed-length segments of the first buffer of the first tape storage apparatus, where the first buffer is separate from a first tape;
    transmit the first data cluster and the synchronization request from the first tape storage apparatus to a second tape storage apparatus operatively coupled to the first tape storage apparatus;
    receive, at the first tape storage apparatus, a writing completion report from the second tape storage apparatus indicating that the first data cluster is written onto a second tape in the second tape storage apparatus; and
    send the writing completion report received from the second tape storage apparatus from the first tape storage apparatus to the host;
  receive at the first tape storage apparatus a second data cluster from the host;
  in response to receiving the second data cluster from the host:
    add the second data cluster to the one of the fixed-length segments of the first buffer of the first tape storage apparatus; and
    transmit the second data cluster from the first tape storage apparatus to the second tape storage apparatus;
  determine that the one of the fixed-length segments of the first buffer of the first tape storage apparatus is completely filled; and
  write the first data cluster and the second data cluster from the one of the fixed-length segments of the first buffer of the first tape storage apparatus onto the first tape, in response to determining that the one of the fixed-length segments of the first buffer of the first tape storage apparatus is completely filled.

13. The computer program product according to claim 12, wherein the computer readable program code is further configured to cause the first tape storage apparatus to:
  identify an error occurring when writing the first data cluster and the second data cluster onto the first tape;
  record, onto non-volatile cartridge memory of the first tape storage apparatus, an error position where the error occurred;
  receive, from the second tape storage apparatus at the first tape storage apparatus via an inter-drive communication connection between the first tape storage apparatus and the second tape storage apparatus, data corresponding to the error; and
  write the data corresponding to the error at the error position within the first tape, without reporting a data writing error to the host.

* * * * *